United States Patent Office 2,781,393
Patented Feb. 12, 1957

2,781,393

DIELS-ALDER ADDUCTS AND PREPARATION OF SAME

Richard Edwin Heckert and Norman Edward Searle, Wilmington, Del., assignors to E. I. du Pont de Nemours & Company, Wilmington, Del., a corporation of Delaware No Drawing. Application December 21, 1953, Serial No. 399,566

9 Claims. (Cl. 260—464)

This invention relates to Diels-Alder adducts and to the process of preparing such adducts.

An object of the present invention is to provide a new class of Diels-Alder adducts and a process of preparing same. A further object is to provide a new class of such compounds which are readily converted to other compounds by reduction or hydrolysis. A still further object is to provide a process whereby these adducts may be prepared readily and in good yields. Other objects will be apparent from the description of the invention given hereinafter.

The above objects are accomplished according to the present invention by reacting tetracyanoethylene with conjugated dienes at temperatures below 100° C. to form 4,4,5,5-tetracyano-1-cyclohexenes. The invention further comprises, as a new class of compounds, the 4,4,5,5-tetracyano-1-cyclohexenes.

Tetracyanoethylene, $(CN)_2C=C(CN)_2$, can be prepared by the reaction of sulfur monochloride with malononitrile, conveniently in the presence of an inert liquid diluent, and thereafter separating the tetracyanoethylene formed from the reaction mixture.

It has now been found that tetracyanoethylene undergoes Diels-Alder addition with conjugated dienes with surprising ease at temperatures below 100° C. to yield 4,4,5,5-tetracyano-1-cyclohexenes. These compounds can be converted by reduction to the corresponding polyamines and by hydrolysis to polycarboxylic acids. Where there is at least one hydrogen each at the 3- and 6-positions of the cyclohexene, the compounds can be readily aromatized with loss of two molecules of hydrogen cyanide to yield the corresponding dicyano benzene derivatives.

The 4,4,5,5-tetracyano-1-cyclohexenes of this invention can be represented by the formula

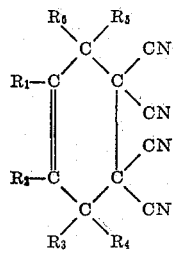

wherein $R_1$, $R_2$, $R_3$, $R_4$, $R_5$ and $R_6$ can be any of the monovalent substituents attached to carbon in organic compounds such as hydrogen, halogen, alkoxyl, cyano, thiocyano, nitro, alkyl (including unsaturated alkyl), aryl, acyl, and the like, including structures in which any two R positions represent the points of attachment for a diradical forming a bridge in the cyclohexene.

The unexpected reactivity of tetracyanoethylene as a dienophile in the Diels-Alder reaction is attested by the fact that 1-cyanoethylene (acrylonitrile) requires several days and the presence of special catalysts and polymerization inhibitors to undergo Diels-Alder condensation with butadiene (U. S. Patent 2,217,632), and that 1,2-dicyanoethylene (fumaronitrile) requires still more forcing conditions of time and temperature to bring about only a fair yield of the condensation product with butadiene (Ziegler et al., Ann. 551, 1 (1942)). To obtain a Diels-Alder condensation of 1,1-dicyano-2-phenylethylene (benzylidine-malonic acid dinitrile) with 2,3-dimethyl butadiene, it is necessary to heat the reactants in an autoclave under pressure at 185–195° C. for an extended period (U. S. Patent 2,264,354). In contrast, 1,1,2,2-tetracyanoethylene reacts so rapidly, for example, with butadiene or anthracene, at room temperature, according to the present invention, that high yields of the desired cyano-substituted cyclohexenes are obtained in a matter of minutes without the addition of special catalysts or polymerization inhibitors.

In a preferred embodiment of this invention butadiene gas is bubbled into a solution of 1,1,2,2-tetracyanoethylene in benzene at room temperature. The butadiene is taken up substantially quantitatively as it is added until the percyanoolefin is exhausted. Isolation and purification of the 4,4,5,5-tetracyano-1-cyclohexene are carried out by conventional techniques.

The compounds of this invention form the new class of 4,4,5,5-tetracyano-1-cyclohexenes. Each compound in the examples below is named as a 1-cyclohexene and its alternate and, in some cases, more proper name is also given, except as to the compound in Example V where there is no tenable method for numbering the compound as a 1-cyclohexene although it is a 4,4,5,5-tetracyano-1-cyclohexene.

The following examples wherein all proportions are by weight unless otherwise stated, illustrate the preparation of specific 4,4,5,5-tetracyano-1-cyclohexenes according to the present invention.

Example I

Tetracyanoethylene, 50 parts, was dissolved in 1053 parts of tetrahydrofuran, and the solution was cooled to −5° C. (ice-salt). Butadiene, introduced through a submerged tube, was bubbled into the solution until an excess was present. The solution was stirred at −5° C. to 0° C. for two hours, and allowed to warm to room temperature. The solvent, evaporated off in a crystallizing dish, left a tan, crystalline residue which weighed 68 parts (94%). A sample recrystallized from tetrahydrofuran-diethyl ether (Darco) gave colorless crystals for analysis.

*Analysis.*—Calculated for $C_{10}H_8N_4$: C, 65.9; H, 3.3. Found: C, 66.10, 65.80; H, 3.31, 3.28.

Infrared absorption indicated the presence of nitrile groups and an unconjugated carbon-carbon double bond.

The analytical data are in accord with:

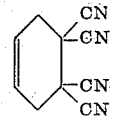

This compound is 4,4,5,5-tetracyano-1-cyclohexene or, alternatively named, 4-cyclohexene-1,1,2,2-tetracarbonitrile.

Fifteen grams of the above tetracyanoethylene/butadiene adduct was heated with 200 ml. of concentrated hydrochloric acid in a sealed Hastelloy bomb with rocking at 150° C. for 15 hours. The solid residue was collected on a filter, washed several times with cold water, dried and then dissolved in ether and filtered. The ether filtrate was evaporated to dryness, and the residue was recrystallized from water to give a white crystalline solid, M. P. 170–171° C. This solid proved to be identical with an authentic sample of trans-Δ⁴-tetrahydrophthalic acid by comparison of their melting point, mixed melting points, and infrared absorption spectra.

Example II

To 792 parts of acetone was added 50 parts of tetracyanoethylene and 70 parts of anthracene. The mixture was stirred at room temperature. After about five minutes the intense blue coloration of the anthracene-tetracyanoethylene complex had almost disappeared, and the reaction was substantially complete. The mixture was heated to boiling to dissolve the suspended solid, filtered, and cooled to 0° C. The white crystalline precipitate was collected on a filter and dried, weight 96 parts (80%). A sample recrystallized from acetone was analyzed.

*Analysis.*—Calculated for $C_{20}H_{10}N_4$: C, 78.4; H, 3.3; N, 18.3. Found: C, 78.6, 78.59; H, 3.41, 3.48; N 17.94, 18.35.

Infrared absorption showed unconjugated nitrile over an aromatic background distinguishable from that of anthracene.

The analytical data are in accord with:

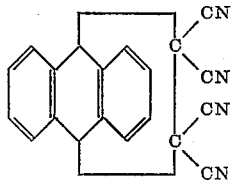

This compound is 1,2-benzo-4,4,5,5-tetracyano-3,6-o-benzeno-1-cyclohexene or, alternatively named, 3,6-o-benzenobenzo(a)-4-cyclohexene-1,1,2,2-tetracarbonitrile.

Example III

Twenty parts of 1,3-cyclohexadiene was added to a solution of 20 parts of tetracyanoethylene in 89 parts of tetrahydrofuran. The solution developed a deep purple color, and as the color faded, the solution became warm and boiled at about 60° C. The solution was evaporated to dryness and the residue recrystallized from chloroform. There was obtained 31 parts (94%) of a white crystalline solid which sublimed or decomposed upon heating to 185–210° C.

*Analysis.*—Calculated for $C_{12}H_8N_4$: C, 69.22; H, 3.87; N, 26.91. Found: C, 69.28, 68.91; H, 3.87, 3.97; N, 26.87, 26.82.

The analytical data are in accord with:

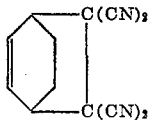

This compound is 4,4,5,5-tetracyano-3,6-ethano-1-cyclohexene or, alternatively named, 3,6-ethano-4-cyclohexene-1,1,2,2-tetracarbonitrile.

Example IV

Myrcene (272 parts) was added to a solution of 200 parts of tetracyanoethylene in tetrahydrofuran. The solution became deep purple, and as the color faded, the heat of reaction warmed the solution to about 45° C. The solution was evaporated to dryness under reduced pressure, and the residue was recrystallized from petroleum ether. Three hundred parts (90%) of the adduct was obtained as white plates, M. P. 52.5° C.

*Analysis.*—Calculated for $C_{16}H_{18}N_4$: C, 72.70; H, 6.10; N, 21.20. Found: C, 72.57, 72.61; H, 6.15, 6.12; N, 21.26, 21.26.

The analytical data are in accord with:

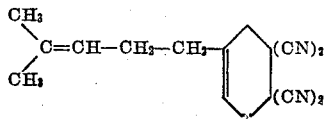

This compound is 4,4,5,5-tetracyano-2-(4-methyl-3-pentenyl)-1-cyclohexene or, alternatively named, 5-(4-methyl-3-pentenyl)-4-cyclohexene-1,1,2,2-tetracarbonitrile.

Example V

A solution of 231 parts of beta-vinylnaphthylene and 192 parts of tetracyanoethylene in 888 parts of tetrahydrofuran was heated under reflux at 60° C.–65° C. for 3 hours. The solvent was removed by evaporation under reduced pressure, and the residue recrystallized from chloroform. There was obtained 400 parts (95%) of white crystals, M. P. 166–168° C. (deep purple melt).

*Analysis.*—Calculated for $C_{18}H_{10}N_4$: C, 76.56; H, 3.57; N, 19.85. Found: C, 76.66, 76.43; H, 3.51, 3.43; N, 19.99, 19.81.

The analytical data are in accord with:

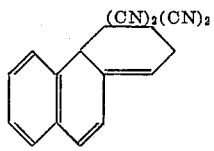

This is 10bH-naphtho(2,1-b)-4-cyclohexene-1,1,2,2-tetracarbonitrile.

Example VI 2,3-dimethylbutadiene (182 parts) was added slowly to a solution of 256 parts of tetracyanoethylene in 1330 parts of tetrahydrofuran. The reaction mixture was allowed to stand 5 minutes at room temperature, and the solvent was removed by evaporation at reduced pressure. The residue was recrystallized from benzene-petroleum ether to yield 370 parts (88%) of white prisms, M. P. 136°–137° C.

*Analysis.*—Calculated for $C_{12}H_{10}N_4$: C, 68.55; H, 4.79; N, 26.65. Found: C, 68.52, 68.59; H, 4.92, 5.04; N, 26.35, 26.58.

The analytical data are in accord with:

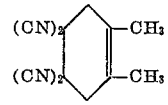

This compound is 4,4,5,5-tetracyano-1,2-dimethyl-1-cyclohexene or, alternatively named, 4,5-dimethyl-4-cyclohexene-1,1,2,2-tetracarbonitrile.

Example VII

Freshly distilled chloroprene (195 parts) was added to a solution of 256 parts of tetracyanoethylene in 888 parts of tetrahydrofuran. Care was taken to exclude all oxygen. The solution was allowed to stand at room temperature for 65 hours, and then evaporated to dryness. The residue was recrystallized from absolute alcohol to give 390 parts (90% yield) of white prisms, M. P. 134° C–135° C.

*Analysis.*—Calculated for $C_{10}H_5N_4Cl$: C, 55.44; H, 2.33; N, 25.87; Cl, 16.37. Found: C, 55.62, 55.63; H, 2.38, 2.45; N, 25.93, 26.07; Cl, 16.34, 16.45.

The analytical data are in accord with:

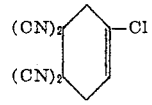

This compound is 1-chloro-4,4,5,5-tetracyano-1-cyclohexene or, alternatively named, 4-chloro-4-cyclohexene-1,1,2,2-tetracarbonitrile.

Example VIII

Tetracyanoethylene, 100 parts, was suspended in 2250 parts of freshly distilled cyclopentadiene and stirred at room temperature. After three hours there remained a powdery white precipitate which did not give colored solutions with benzene or benzene-anthracene. The excess cyclopentadiene was removed under a jet of nitrogen on a steam table. The residue weighed 153 parts (100%) and a sample for analysis was crystallized from methanol.

*Analysis.*—Calculated for $C_{11}H_8N_4$: C, 68.0; H, 3.1; N, 28.9. Found: C, 68.24, 68.25; H, 3.24, 3.25; N, 29.20, 29.01.

On a preheated block, the compound melted at 223° C. and sublimed slowly above about 160° C.

The analytical data are in accord with:

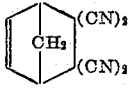

This compound differs from that of Example I only in having an endomethylene bridge, is 4,4,5,5-tetracyano-3,6-methano-1-cyclohexene or, alternatively named, 3,6-methano - 4 - cyclohexene - 1,1,2,2 - tetracarbonitrile.

Example IX

A solution prepared by dissolving 26 parts of 1,2-dimethylene cyclohexane and 23 parts of tetracyanoethylene in 1230 parts of methanol, is heated to reflux temperature for one hour. The solvent is then removed by evaporation, leaving 44 parts of crude product. After two recrystallizations from aqueous methanol, tetrahydrobenzo (a) - 4,4,5,5 - tetracyano - 1 - cyclohexene or, alternatively named, 4,5 - tetrahydrobenzo - 4 - cyclohexene-1,1,2,2 - tetracarbonitrile, is obtained in the form of white platelets melting at 166–167° C.

*Analysis.*—Calculated for $C_{14}H_{12}N_4$: N, 23.7. Found: N, 22.99; 23.03.

This compound has the following formula:

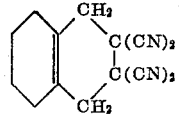

It will be understood that the above examples are merely illustrative and that the present invention broadly comprises reacting tetracyanoethylene with conjugated dienes at temperatures below 100° C. to form 4,4,5,5-tetracyano-1-cyclohexenes, as well as the 4,4,5,5-tetracyano-1-cyclohexenes as a new class of compounds.

In carrying out the process of the present invention there can be employed as dienes any of the conjugately unsaturated organic compounds which give normal Diels-Alder adducts with maleic anhydride. These include (1) acyclic conjugates such as butadiene, alkylbutadienes, arylbutadienes, and conjugated polyenes; (2) alicyclic conjugates such as those of wholly alicyclic systems, e. g., cyclopentadiene, 1,3-cyclohexadiene, fulvenes, those of bicyclic systems, e. g., 1,1'-bicyclohexenyl, and those of alicyclic-acyclic systems, e. g., 1-vinyl-1-cyclohexene and 1 - vinyl - 3,4 - dihydronaphthalene; (3) aromatic conjugates such as those of wholly aromatic systems, e. g., anthracene, 9,10-dialkylanthracenes, and pentacene, those of aromatic-acyclic systems, e. g., isosafrole, 1-vinylnaphthalene, and 9-vinylphenanthrene, and those of aromatic-alicyclic systems, e. g., 1-alpha-naphthyl-1-cyclopentene; and (4) heterocyclic compounds such as furan, isobenzofurans, and alpha-pyrone, as well as the simple substituted derivatives of these dienes with substituents such as halogen, alkoxyl, cyano, nitro, thiocyano, acyl, and the like.

The surprising ease of reaction of tetracyanoethylene with conjugated dienes at temperatures below 100° C. is in sharp contrast with the difficulties encountered in bringing about the reaction of substituted olefins generally with dienes. This unexpected reactivity of tetracyanoethylene may be associated with its constitution, since it is composed entirely of carbon and nitrogen, or it may be explained by some yet unobserved characteristic. As shown by the examples, the reaction proceeds at room temperature and even temperatures well below that in some instances.

The conditions under which the addition reaction of tetracyanoethylene with dienes takes place, can be varied widely. For example, when butadiene is employed, it may be desirable to carry out the reaction at temperatures below —3° C. to retard the escape of the butadiene as a gas, or it may be desirable to carry out such a reaction in a closed vessel so that autogenous or higher pressures can be used, thereby retaining the gas and promoting the reaction. When the reactants are both solids at ordinary temperatures, it may be preferred to operate at temperatures above their mixed melting point or in the presence of a mutual solvent such as an aromatic hydrocarbon.

The 4,4,5,5-tetracyano-1-cyclohexenes of this invention form an entirely new class of compounds leading to a wide variety of potential products. It is not only that these new compounds per se have been added to the list of known chemical compounds but, of great importance, they afford an invaluable means of preparing a vast array of compounds heretofore unknown or at least impractically difficult to synthesize. The fact this new class of compounds may be converted by reduction to the corresponding polyamines and by hydrolysis to polycarboxylic acids add markedly to their practical worth. Thus Example I illustrates that the hydrolysis of 4,4,5,5-tetracyano-1-cyclohexene proceeds in the expected manner to produce tetrahydrophthalic acid, which is a member of a class of polycarboxylic acids recognized as highly useful in the prior art. U. S. Patent No. 1,860,730 to Brooks et al. discloses tetrahydrophthalic acid to be useful for reacting with polyhydric alcohols to prepare molded articles and coating compositions. French Patent No. 708,811 discloses tetrahydrophthalic acid as a component in softeners for phenol-formaldehyde resins to be used in films, plastic bodies, paints and varnishes, adhesives, insulating papers and impregnated cloth. German Patent No. 545,636 discloses the use of tetrahydrophthalic acid in the preparation of varnishes.

As many apparently widely different embodiments of this invention may be made without departing from the spirit and scope thereof, it is to be understood that the invention is not limited to the specific embodiments thereof except as defined in the appended claims.

The invention claimed is:

1. As a new class of compounds, 4,4,5,5-tetracyano-1-cyclohexenes.
2. 4,4,5,5-tetracyano-1-cyclohexene.
3. 1,2 - benzo - 4,4,5,5 - tetracyano - 3,6 - o - benzeno-1-cyclohexene.
4. Process of preparing a 4,4,5,5-tetracyano-1-cyclohexene which comprises reacting tetracyanoethylene with a conjugated diene at a temperature below 100° C.
5. Process of preparing 4,4,5,5-tetracyano-1-cyclohexene which comprises reacting tetracyanoetheylene with butadiene at a temperature below 100° C.
6. Process of preparing 1,2-benzo-4,4,5,5-tetracyano-3,6-o-benzeno-1-cyclohexene which comprises reacting tetracyanoethylene with anthracene at a temperature below 100° C.
7. 4,4,5,5 - tetracyano - 3,6 - ethano - 1 - cyclohexene.
8. 1-chloro-4,4,5,5-tetracyano-1-cyclohexene.
9. 4,4,5,5 - tetracyano - 3,6 - methano - 1 - cyclohexene.

References Cited in the file of this patent

UNITED STATES PATENTS

| | | |
|---|---|---|
| 2,264,354 | Alder et al. | Dec. 2, 1941 |
| 2,450,627 | Bloch | Oct. 5, 1948 |
| 2,510,491 | Ardis | June 6, 1950 |